(12) United States Patent
Weiser et al.

(10) Patent No.: US 10,574,706 B2
(45) Date of Patent: Feb. 25, 2020

(54) METHOD AND SYSTEM FOR UPLOAD OPTIMIZATION

(71) Applicant: FLASH NETWORKS, LTD, Herzliya (IL)

(72) Inventors: Adi Weiser, Givatayim (IL); Meiron Tzhori, Kadima (IL)

(73) Assignee: Flash Networks, LTD, Herzliya (IL)

( * ) Notice: Subject to any disclaimer, the term of this patent is extended or adjusted under 35 U.S.C. 154(b) by 111 days.

(21) Appl. No.: 15/598,305

(22) Filed: May 17, 2017

(65) Prior Publication Data

US 2017/0346749 A1 Nov. 30, 2017

Related U.S. Application Data

(60) Provisional application No. 62/342,964, filed on May 29, 2016.

(51) Int. Cl.

| | |
|---|---|
| *H04B 17/364* | (2015.01) |
| *H04L 5/00* | (2006.01) |
| *H04L 12/26* | (2006.01) |
| *H04L 12/807* | (2013.01) |
| *H04L 12/825* | (2013.01) |
| *H04L 29/06* | (2006.01) |
| *H04L 12/841* | (2013.01) |
| *H04L 12/801* | (2013.01) |

(52) U.S. Cl.
CPC ......... *H04L 65/105* (2013.01); *H04B 17/364* (2015.01); *H04L 47/27* (2013.01); *H04L 5/0055* (2013.01); *H04L 43/0888* (2013.01); *H04L 47/193* (2013.01); *H04L 47/283* (2013.01)

(58) Field of Classification Search
CPC . H04B 17/364; H04L 5/0055; H04L 43/0864; H04L 47/193; H04L 47/27; H04L 47/283; H04L 65/105
See application file for complete search history.

(56) References Cited

U.S. PATENT DOCUMENTS

| | | | | |
|---|---|---|---|---|
| 7,480,707 | B2* | 1/2009 | Morlitz | H04L 29/06 709/223 |
| 7,502,318 | B2* | 3/2009 | Lindsay | H04L 1/1671 370/230 |
| 7,564,792 | B2* | 7/2009 | Singh | H04L 47/10 370/236 |
| 7,698,453 | B2* | 4/2010 | Samuels | H04L 41/12 709/218 |

(Continued)

*Primary Examiner* — Alpus Hsu
(74) *Attorney, Agent, or Firm* — Smith Tempel Blaha LLC; Gregory Scott Smith

(57) ABSTRACT

A technique for manipulating one mobile device (MD) from a plurality of MDs to maintain the transmitting rate of packets of an upload session to one Internet Protocol (IP) server from a plurality of IP servers is disclosed. The technique may utilize an upload-rate-controlling server that is communicatively coupled between the plurality of MDs and the plurality of IP servers and is configured to respond to missing one or more packets by using SACK and DSACK messages. Other embodiments may estimate the delay of the uploaded packets and adapt the value of a new-receiving window such that the delay of the uploaded packets is smaller than the value of the time threshold used by intermediate nodes for dropping packets.

10 Claims, 5 Drawing Sheets

(56) References Cited

U.S. PATENT DOCUMENTS

| | | | |
|---|---|---|---|
| 7,729,347 B2* | 6/2010 | Rosberg | H04L 47/10 370/389 |
| 7,920,470 B2* | 4/2011 | Lindsay | H04L 1/1671 370/230 |
| 7,934,007 B2* | 4/2011 | Wang | H04L 12/1868 709/230 |
| 8,045,463 B2* | 10/2011 | Radunovic | H04W 40/04 370/231 |
| 8,069,250 B2* | 11/2011 | Panjwani | H04L 47/10 709/224 |
| 8,238,243 B2* | 8/2012 | Diaz | H04L 47/10 370/232 |
| 8,363,650 B2* | 1/2013 | Rao | H04L 12/2856 370/389 |
| 8,572,217 B2* | 10/2013 | Verma | H04L 29/12028 370/392 |
| 8,892,720 B2* | 11/2014 | Diaz | H04L 12/40013 709/218 |
| 8,973,073 B2* | 3/2015 | Phillips | H04N 21/23805 370/389 |
| 9,444,749 B2* | 9/2016 | Cociglio | H04L 47/2475 |
| 9,882,831 B2* | 1/2018 | Smirnov | H04L 47/10 |
| 9,961,585 B2* | 5/2018 | Szilagyi | H04W 28/0289 |
| 2007/0008884 A1* | 1/2007 | Tang | H04L 29/06 370/230 |
| 2009/0130984 A1* | 5/2009 | Lee | H04W 12/02 455/67.11 |
| 2014/0192639 A1* | 7/2014 | Smirnov | H04L 47/10 370/230 |

* cited by examiner

METHOD AND SYSTEM FOR UPLOAD OPTIMIZATION

CROSS-REFERENCE TO RELATED APPLICATIONS

This is a utility patent application being filed in the United States as a non-provisional application for patent under Title 35 U.S.C. § 100 et seq. and 37 C.F.R. § 1.53(b) and, claiming the benefit of the prior filing date under Title 35, U.S.C. § 119(e) of the United States provisional application for patent that was filed on May 29, 2016 and assigned Ser. No. 62/342,964, which application is incorporated herein by reference in its entirety.

FIELD OF THE DISCLOSURE

The present disclosure generally relates to the field of data communication over a packet switch network such as Internet Protocol (IP) packets. More particularly the disclosure relates to transmission rate control of IP packets during uploading data from a mobile device.

DESCRIPTION OF BACKGROUND ART

In the past the Internet was used as non-symmetrical network, in which most of the data traffic was directed from the Internet servers toward the users' devices. Accordingly, common flow control and load control methods are designed to control the traffic from an Internet server toward a user device. For example, Internet servers are configured to use a congestion-avoidance-control mechanism. In some cellular networks, intermediate nodes may use congestion-avoidance-control mechanism such as Active Queue Management (AQM) in order to control their contribution to the current load over the connection. The congestion-avoidance-control mechanism controls the rate of data entering the network from that server and keeping the data flow below a rate that would trigger unmanaged congestion event. In addition, congestion-avoidance-control mechanism and/or AQM technique also used to fairly allocate resources among downstream flows.

On the other end, user devices are designed to control the downloaded rate of their own flow according to the current capabilities of the user devices. For example, controlling the download rate of flows over a TCP/IP connection to a client, the client is designed to change the size of the "receive window" parameter that the client sends toward an Internet server. Thus, limiting the number of transmitted bytes that can be sent from a web server, between two consecutive acknowledgements that were sent from the client. A TCP/IP connection stands for Transmission Control Protocol over Internet Protocol network. Along the disclosure and the claims the terms "receive window" or "advertising window" can be used interchangeably.

In addition, intermediate nodes or servers, between a user device and a web server, which delivers the requested data, are configured to use a congestion-avoidance-control mechanism, thus an intermediate node has its own buffers and is configured to drop packets, when the buffers reach a certain limitation. Some of those intermediate servers control the buffers based on a threshold that is defined in number of bytes and some of the servers are configured to control the buffer based on latency values. Along the disclosure and the claims the terms "packet" or "byte" can be used interchangeably.

Today the Internet becomes more and more symmetrical. There are more and more applications in which a user can upload a large volume of data toward an Internet server. Some of those applications comprise applications such as but not limited to "Facebook" or "Instagram" (Facebook and Instagram are trademarks of Facebook Inc. USA) that allow uploading of images, video images, etc. Today, even emails can carry a large volume of data, images, files etc. Further, there are applications that allow real-time communication sessions, such as but not limited to chat, video or audio conferencing, etc. that have symmetrical upload and download volume of data.

In an uploading session a user device acts as a server and sends IP packets toward the Internet. While the destination server acts as a client that is configured to receive those packets. However, a common user device is configured to use common TCP/IP congestion-avoidance-control mechanism, which is not optimized for uploading session in dynamic networks. A cellular access network can be used as an example of a dynamic network, in which bandwidth (BW) and the latency are changed dynamically. Consequently, buffers in between the user device and the destination server can reach their buffer limitations and start dropping packets.

In TCP/IP connection, dropping packets will cause lost packet indication from the destination, which will follow by retransmission and reducing dramatically the bitrate of the transmission. In common TCP/IP connection the congestion window can be reduced up to half of the previous value. Thus, increasing the upload time and reducing the experience of the user. The congestion window is used by the transmitting side to limit the number of bytes sent and not acknowledged yet.

Further, more and more users use their smart phones in order to communicate over the Internet and upload data such as video or images. Images and video that are captured by the smartphone camera, for example. Common cellular intermediate nodes that are located in between the mobile device and the Internet, at the cellular operator premises, are configured to have tight buffer limitations. Some of those buffer limitations are volume related (their threshold is given in number of bytes) other buffer limitations are time related. An intermediate node, which uses time domain limitation, can be configured to drop packets that are stored in buffers more than a certain limit. For example buffer limitation that is used over a connection between a mobile device and an LTE operator premises may be given in time domain. Usually intermediate nodes, at LTE networks, are configured to drop stored packets which are stored more than 200 milliseconds, for example. LTE stands for 3GPP Long Term Evolution, which is also referred as 4G. An example of an intermediate node can be EnodeB (Evolved Node B) of an LTE cellular operator.

BRIEF SUMMARY

The needs and the deficiencies that are described above are not intended to limit the scope of the inventive concepts of the present disclosure in any manner. The needs are presented for illustration only. The disclosure is directed to a novel technique for controlling the transmission rate, from a user's device in an upload session, by an intermediate node. Wherein the intermediate node is located between the user's device and an IP server. Along the description and the claims the terms upload and upstream can be used interchangeably. Along the disclosure and the claims the terms "user's device" or "mobile device" can be used interchangeably.

Dropping packets of TCP/IP of uploading flow of packets at intermediate nodes between a user's device, such as but not limited to a mobile device, and the Internet access network at a cellular operator premises causes inefficient usage of radio resources over the expensive cellular connection and increases the upload time. Consequently, reducing the packets loss in flows of upload sessions is a common interest of the operator as well as the user. However, the congestion-avoidance-control mechanism of a user device is not adapted to the dynamic of a common cellular access network. An example of an intermediate node can be EnodeB (Evolved Node B) of an LTE cellular operator; or node B in 3G or any similar intermediate node over other mobile networks.

In order to reduce the packet loss in between a user device and the access network of a cellular operator, an example embodiment of an upload-rate-controller server (URCS) can be installed in an access network between the mobile devices and the Internet. An example of an URCS can be configured to control the transmission rate of one or more flows of packets from a user device during an upload TCP/IP communication session in order to reduce the packet loss over the upload connection between the user's device and the URCS.

An example of URCS can be configured to estimate the delay over an upload connection between a user device and the URCS. Based on the estimated delay the URGS may control the user's device transmission rate in order to keep the delay over an upload connection, with the mobile device, below a certain time limitation, a certain time threshold. Wherein the value of the time threshold is smaller than the value of the time threshold used by buffers along the upload connection.

An example embodiment of the disclosed technique can be based on an assumption that the time it takes to transmit or receive, by the user's device or the URCS, the amount of bytes, which is limited by the value of the receive window, is smaller than the latency over the buffers along the connection. For such a case the receive window of the URCS may be calculated as a function of the time threshold (TT) for dropping packets that is used by the intermediate nodes of the cellular operator and the rate that the packets reach the URCS. A common value for TT can be between 100 to 200 milliseconds, for example. In some networks the value of TT can be up to few seconds.

From time to time an example of URCS can count the amount of bytes that are obtained (NoBY) during a measuring period (MP). The MP can be a portion of TT, MP=TT divided by 'n' (MP=TT:n); the value of 'n' can be any number in the range of three to ten, such as five, for example. Other embodiments may use other values or other ranges for 'n'. Based on the NoBY, an example embodiment can set the value of its receive window to the product of the NoBY by the factor 'n*k', where k is a tuning factor. An example value of k can be in the range between 0.5 and 2. The next receive window (NRW) can be set to the value of the product of NoBY by n and by k, NRW=NoBY*(n*k).

In some embodiments number of packets may be used instead of NoBY (number of obtained bytes). In some embodiments several consecutive measurements can be done and the highest value of NoBY per MP can be used.

Other embodiments of URCS may calculate the value of the receive window based on the assumption that the delay of the packets, the latency time along a connection between a user device and the URCS, is a function of the propagation delay over the connection, between the mobile device and the URCS, and the load over the one or more intermediate nodes such as one or more EnodeB that are located in between the mobile device and the URCS.

Such example embodiment of an URCS, can estimate the delay over the connection with the user device by estimating the value of RTT (round trip time) along the connection. The RTT can be estimated once during establishing the TCP/IP connection between the user's device and the URCS by measuring the time interval of a TCP 3-Way handshake. The time interval between Syn.; Syn-Ack; and Ack. TCP 3-Way handshake is well known to a person having ordinary skill in the art and will not be further disclosed. Consequently the RTT reflects the delay over the communication link between the transmitting device and the receiving device. The RTT value can be used as a good estimation for the current delay over the connection between the user's device and the URCS. The current delay is a function of the propagation delay and the delay in the buffers in one or more intermediate nodes.

In order to measure the RTT during the ongoing upload session, an example embodiment of a URCS can be configured to measure the time interval between sending an ACK with a receive window, which is larger than the current receive window, waiting to get the number of bytes, according to the parameter used by the larger receive window. This number is larger than the current receive window by one, for example. Other embodiments may use other factors than one. Indicating that this bunch is related to the new value of the receive window. This time interval can be used as an estimate value of the current RTT from which the latency over the connection can be calculated.

Next, the example embodiment of an URCS can estimate how many uploading data bytes are needed in order to reach the time limitation of the buffers in the intermediate nodes between the user's device and the URCS. According to the estimated number of bytes the example of URCS can adapt the value of it's receive window and inform the user's device about the new value of the receive window. A safety factor can be used while defining the receive window in order to avoid byte dropping in the buffers of the intermediate nodes.

An example embodiment of the disclosed URCS can calculate a required receive window, which can prevent dropping of bytes in intermediate nodes between the user device and the URCS during uploading session. An example process for estimating the receive window can comprise: obtaining or defining the time threshold (TT) used in the intermediate nodes; obtaining or defining a value for the propagation delay (PD) along the connection between the user's device and the URCS. The values of the PD and/or TT can be found in the literature of the cellular operator, or of the technical equipment used in the intermediate nodes. In addition a safety factor can be used.

Example embodiments of the present disclosure can define a measuring period (MP), 50 milliseconds for example. The values of MP can be in the range of few tens of milliseconds, 10-70 milliseconds for example. During the MP an example embodiment of the disclosed URCS can count the amount of obtained bytes. Next, the example of URCS can repeat counting the number of obtained bytes in few consecutive MPs, 5-10 periods of MPs, for example. Then, a MAX value of the obtained bytes per MP can be defined and a new value NRW can be set to NRW=(TT:MP)*MAX. From time to time an example embodiment of a URCS can be configured to repeat the process of setting the value of the NRW for adapting it according to the dynamic of the network.

Some example embodiments of the disclosed URCS may be configured to respond to a packet loss by reporting on the loss in a first and a second acknowledge packets. The first acknowledge packet (ACK) can be a Selective ACK (SACK) indicating missing of one or more packets. The second acknowledge packet can be a Duplicate-Selective ACK (DSACK). Using a DSACK in response to missing one or more packets is tricky and targeted to avoid reducing the congestion window, and hence the transmitting rate by the user's device. By using the DSACK, an example embodiment of URCS cheats the user's device and spoofs it to conclude that the missing packets were not missed and just arrived later-on, out of order. Such a conclusion at the user's device, during an upload session, will prevent reducing the congestion window, and hence the reducing of the transmitting rate, and neutralizes the rate control mechanism at the user's device during an upload session.

The foregoing summary is not intended to summarize each potential embodiment or every aspect of the present invention. Other features and advantages of the present invention will become apparent upon reading the following detailed description of the example embodiments with the accompanying drawings and appended claims.

Furthermore, although specific example embodiments are described in detail to illustrate the inventive concepts to a person skilled in the art, such embodiments can be modified to various modifications and alternative forms. Accordingly, the figures and written description are not intended to limit the scope of the inventive concepts in any manner.

Other objects, features, and advantages of the present disclosed system will become apparent upon reading the following detailed description of the embodiments with the accompanying drawings and appended claims.

BRIEF DESCRIPTION OF THE SEVERAL VIEWS OF THE DRAWING

Exemplary embodiments of the present disclosure will be understood and appreciated more fully from the following detailed description, taken in conjunction with the drawings in which.

DETAILED DESCRIPTION OF EMBODIMENTS OF THE INVENTION

Turning now to the figures in which like numerals represent like elements throughout the disclosed several exemplary embodiments of the present disclosure. For convenience, only some elements of the same group may be labeled with numerals. The purpose of the drawings is to describe exemplary embodiments and not for production. Therefore features shown in the figures are chosen for convenience and clarity of presentation only. Moreover, the language used in this disclosure has been principally selected for readability and instructional purposes, and may not have been selected to delineate or circumscribe the inventive subject matter, resort to the claims being necessary to determine such inventive subject matter.

Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

Although some of the following description is written in terms that relate to software or firmware, embodiments may implement the features and functionality described herein in software, firmware, or hardware as desired, including any combination of software, firmware, and hardware. In the following description, the words "unit," "element," "module" and "logical module" may be used interchangeably. Anything designated as a unit or module may be a stand-alone unit or a specialized or integrated module. A unit or a module may be modular or have modular aspects allowing it to be easily removed and replaced with another similar unit or module. Each unit or module may be any one of, or any combination of, software, hardware, and/or firmware, ultimately resulting in one or more processors programmed to execute the functionality ascribed to the unit or module. Additionally, multiple modules of the same or different types may be implemented by a single processor. Software of a logical module may be embodied on a computer readable medium such as a read/write hard disc, CDROM, Flash memory, ROM, or other memory or storage, etc. In order to execute a certain task a software program may be loaded to an appropriate processor as needed. In the present disclosure the terms task, method, and process can be used interchangeably.

Figure 1:
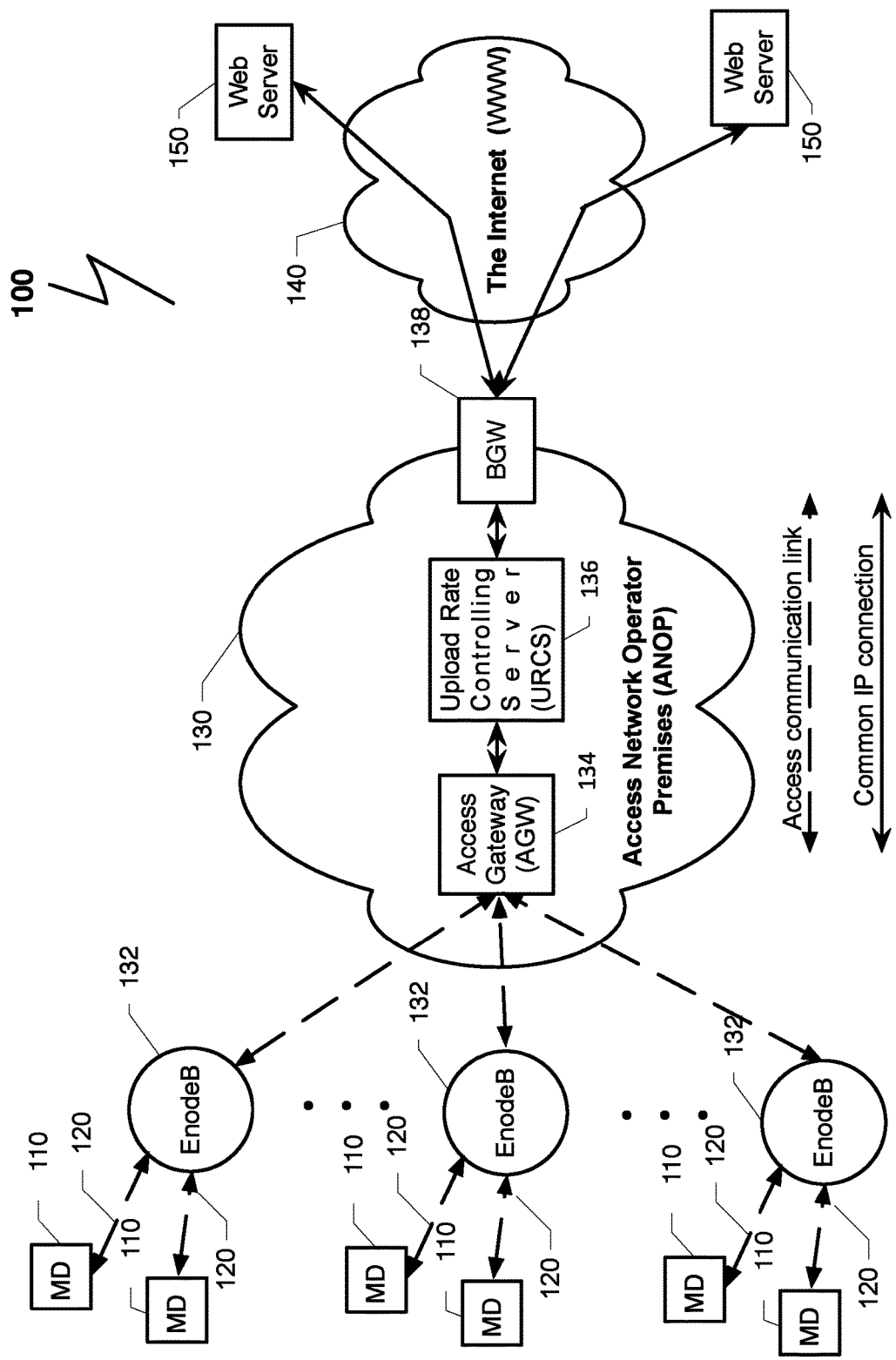
FIG. 1 illustrates a block diagram with relevant elements of an example Access Network Operator Premises in which an exemplary embodiment of the present disclosure can be implemented.

FIG. 1 depicts a block diagram with relevant elements of a communication network 100 in which an example embodiment of the present disclosure can be implemented. Network 100 can comprise an Access Network Operator Premises (ANOP) 130. The Access-Network Operator can be a cellular operator, a telecom operator, an Internet provider, a satellite communication service provider, a Public Switched Telephone Network (PSTN) operator, etc. Other exemplary embodiments of the present disclosure can be installed at an Internet Service Provider (ISP) premises, and so on.

An ANOP 130 can provide different services to a plurality of different surfers (or to the mobile device utilized by a surfer) MD 110. A few non-limiting examples of typical MD 110 can be: a laptop, a mobile phone, a PDA (personal digital assistance), smart phone, a tablet computer, etc. A few non-limiting examples of services provided by an ANOP 130 can include: spam filtering, content filtering, bandwidth consumption distribution, transcoding, upload-rate adaptation, etc.

An exemplary ANOP 130 can be used as an intermediate node between the plurality of MDs 110 and the Internet 140. Among other elements, an example of ANOP 130 may comprise: an access gateway (AGW) 134; an URCS 136 and a border gateway (BGW) 138. An example of AGW 134 can be configured to identify the plurality of MD 110 at its ingress, for example. A few non-limiting examples of an AGW 134 may include: a Serving GPRS Support Node (SGSN) in a GSM network, a PDSN in a CDMA network, etc. In LTE network an example of an AGW 134 can be a Packet-Data-Network (PDN) Gateway. An example of AGW 134 is required to: identify the services being requested by a surfer; identify the services a subscriber is entitled to receive; route traffic of the subscriber through the appropriate services; and output processed data toward the subscriber or the Internet, for example.

An MD 110 can be connected to the AGW 134 via different communication links 120 and intermediate nodes such as but not limited to EnodeB 132. The communication links 120 can be such as but not limited to: wireless links, cellular links, and so on. The BGW 138, at the output of ANOP 130 toward the Internet 140 can be an Internet Protocol router, for example. The BGW 138 can be connected to a plurality of web-servers 150 via an IP network such as the Internet 140, for example. The BGW 138 can also be connected to private packet data networks (not shown in the figures) such as, but not limited to an Intranet, LAN, WAN, etc. The communication between the BGW 138 and the web-servers 150 and/or the private packet data network can be packet oriented, which can be based on the Internet Protocol (IP), for example.

An example of URCS 136 can be configured to receive data packet communication transmitted between the plurality of MDs 110 and the plurality of servers 150 located at network 140 via the AGW 134 and BGW 138, respectively. In the upload direction, the AGW 134, can intercept packets received from the MD 110, identify packets that belong to uploading sessions and forward them toward the URCS 136. Packets that do not belong to upload sessions can be transferred toward its destination via BGW 138. Packets that belong to "Facebook" or "Instagram", chat, videoconferencing, etc. applications can be used as non-limiting examples of sessions that have high volume of uploading data.

An example of URCS 136 can be configured to fulfil the task of a rate controller on behalf of a targeted web server at an uploading session. Such an URCS 136 can be configured to maintain the upload transmitting rate of the MD 110. Maintaining the upload transmitting rate along the path between a MD 110 and a web server 150 improves the bandwidth consumption over expensive wireless connection and improves the customer satisfaction during upload sessions. More information on the operation of an example of URCS 136 is disclosed below in conjunction with FIGS. 2 to 5.

Figure 2:
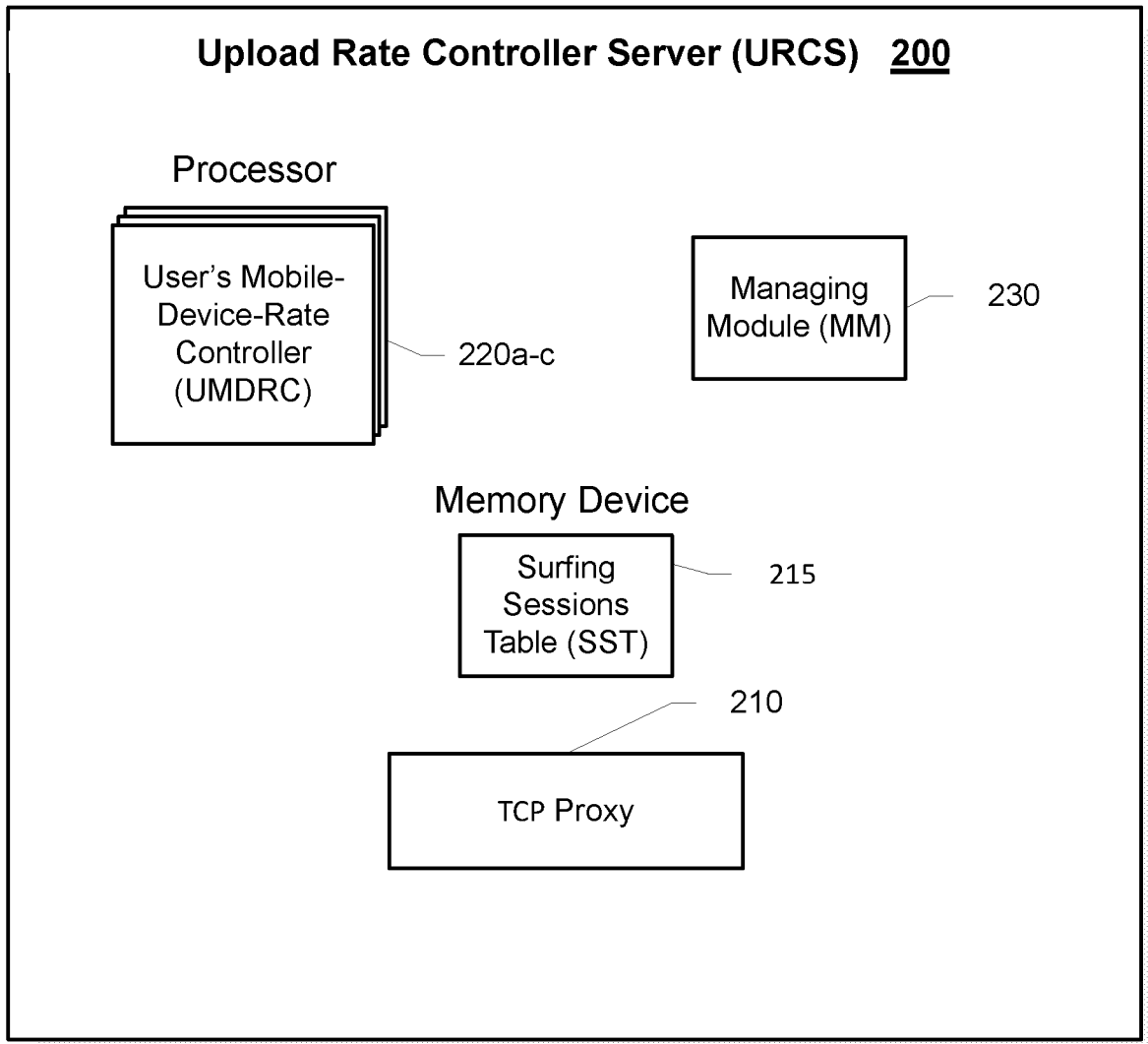
FIG. 2 illustrates a block diagram with relevant elements of an example of an upload-rate-controller server (URCS), according to the teaching of the present disclosure.

FIG. 2 depicts a block diagram with relevant elements of an example embodiment of an Upload-Rate-Controller Server (URCS) 200. An example of URCS 200 can comprise a TCP proxy 210, a surfing-session table (SST) 215, a plurality of User's-Mobile-Device-rate controller (UMDRC) 220a-c, and a manager module (MM) 230. In addition URCS 200 can be associated with one or more databases not shown in the figures.

An example of a TCP proxy 210 can be a transparent TCP proxy. In one direction, the TCP proxy 210 can receive a plurality of request packets, from different surfers using MDs 110 (FIG. 1). Each obtained packet, of a new connection, can be processed by the TCP proxy 210. Based on parsing the header of the packet, the TCP proxy 210 can determine the type of the obtained packet. If the type of the obtained packet is a request to establish an upload session, then the request can be transferred toward a queue of the MM 230 for further processing. The MM 230 process can comprise allocating an appropriate UMDRC 220 for controlling the rate of the upload packets. An entry in the SST 215 can be allocated for that upload session and the allocated UMDRC 220 can be marked as the next hop for the following packets of that session.

In addition, an example of TCP proxy 210 can be configured to reduce the amount of retransmissions of missing packets, in an upload session, by spoofing the relevant MD 110 that packets arrived out of order and not were dropped along the connection. More information on the operation of an example embodiment of TCP proxy 210 is disclosed below in conjunction with FIG. 3.

If the obtained packet is not a request to establish an upload session, then the SST 215 can be updated with a new entry, which is assigned for the new session. A field in the SST that is associated with the session type can be updated as a non-upload session and the packet can be transferred toward its destination via the TCP proxy 210. Following packets of the same session can be transferred directly toward their destination.

An example of a UMDRC 220a-c can comprise a plurality of threads 220 one per each upload session. An example embodiment of UMDRC 220 can be configured to estimate the delay over the upload connection between the user device and the URCS and to control the user's device's transmission rate in order to keep the delay over the connection with the mobile device below the relevant time limitation, time threshold, of buffers along the connection between the user device 110 (FIG. 1) and the relevant server 150 in order to avoid dropping packets by the intermediate nodes 132. An example of UMDRC 220 can be configured to control the upload rate by changing the size of the receive window according to the current condition over the connection. More information on the operation of an example embodiment of UMDRC 220 is disclosed below in conjunction with FIG. 5.

An example embodiment of a Manager Module (MM) 230 can allocate a plurality of computing and storage resources that can be needed by the URCS 200 for its operation. Resources such as but not limited to storage resources used by the SST 215, computing resources that are used by the plurality of UMDRC 220, etc. An exemplary embodiment of the MM 230 can periodically scan the SST and release resources that are no longer required (i.e. resources which were allocated to sessions which are not active along a configurable period of time). The MM 230 can communicate with other servers in the ANOP 130 (FIG. 1) for management information and/or for communicating status and control data. More information on the operation on the MM 230 is disclosed below in conjunction with FIG. 4.

Figure 3:
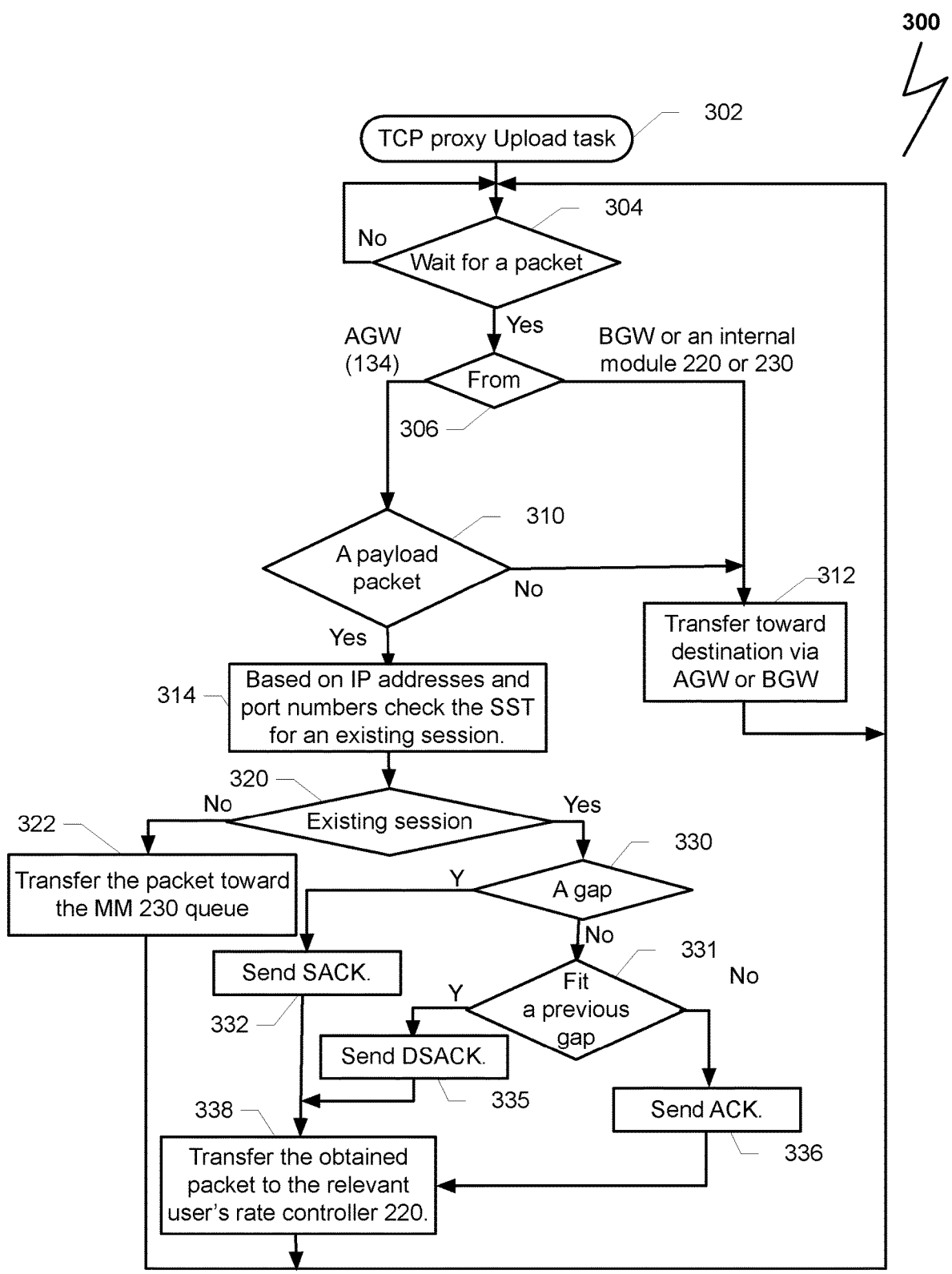
FIG. 3 illustrates a flowchart with relevant actions of a process that can be implemented by an example of TCP proxy, according to the teaching of the present disclosure.

FIG. 3 illustrates a flowchart with relevant actions that can be implemented by an example embodiment of a TCP proxy 210 (FIG. 2) during an upload session. The upload session is directed from an MD 110 toward a web server 150 (FIG. 1), for example. The process 300 can commence upon initiating a relevant URCS 200 (FIG. 2) and be executed by the TCP proxy 210 (FIG. 2), for example. Upon initiation 302 process 300 may check its input queue looking for 304 a next packet in the queue. If 304 there is no packet the checking process 304 can be executed in a loop until a packet is obtained.

Upon obtaining a packet 304, the header of the packet can be parsed and a decision can be made 306 whether the packet is obtained from the AGW 134 or from the BGW 138 (FIG. 1) or from an internal module (UMDRC 220 or the MM 230) of URCS 200 (FIG. 2). Packets from the internal modules or the BGW 138 are transferred 312 toward their destination via the AGW 134 or the BGW 138 based on their destination address and process 300 returns to block 304 for handling the next packet in the queue.

Packets from the AGW 134 are further processed and a decision is made 310 whether the packet carries payload or not. If 310 the packet does not have a payload the process proceed to block 312 and the obtained packet can be transferred 312 toward its destination via the BGW 138 and process 300 returns to block 304 for handling the next packet in the queue.

If 310 the packet carries a payload, then process 300 proceed to block 314. Based on the IP source and destination addresses and ports the SST 215 (FIG. 2) is checked 320 looking for an entry that is associated with those addresses and ports, which means that the packet belong to an existing session. If 320 the packet does not belong to an existing session, then the packet is transferred 322 toward an input queue of the MM 230 (FIG. 2), allowing the MM 230 to determine how to handle the new session. Next, process 300 returns to block 304 for handling the next packet in the queue of the TCP proxy 210.

If 320 the packet belongs to an existing session, then the relevant entry at the SST 215 (FIG. 2) is further processed in order to determine 330 whether there is a gap in the stream of bytes between previously obtained packets and the current one.

If 330 a there is a gap, which means that one or more packets or bytes are missed or obtained out of order, then process 300 can respond 332 by reporting on the gap by a Selective ACK (SACK). Process 300 can proceed to block 338 and transfers the obtained packet to the relevant user's rate controller 220a-c (FIG. 2), to be handled in block 510 (FIG. 5), which is disclosed below. In some embodiments, the relevant entry in the SST 215 can be updated indicating the gap in the stream of obtained bytes. Next, process 300 can return to block 304 for obtaining the next packet in the queue.

Returning now to block 330, if a gap does not exist then at block 331 a decision is made whether the received packet fit a previous gap (missing or out-of-order packet). If it does, then a DSACK can be sent 335 and the process proceeds to block 338. If it does not fit a previous gap, then send an ACK can be sent and process 300 proceeds to block 338. In some embodiments, the relevant entry in the SST can be updated accordingly.

Using a DSACK in response to missing one or more bytes is tricky and targeted to avoid reducing the congestion window and transmitting rate by the user's device. The DSACK spoofs the MD 110 (FIG. 1) to conclude that the originally sent packet was not lost but was received out-of-order, later-on. Such a conclusion at the MD 110, in an upload session, prevents reducing the transmitting bitrate and maintains the current upload bitrate. Thus, neutralizes the rate control mechanism at the user's device during an upload session.

Then the relevant entry in the SST 215 can be updated with information regarding the relevant obtained bytes and the packet can be transferred 338 toward the relevant user's rate controller. Next, process 300 can return to block 304 for obtaining the next packet in the queue.

Figure 4:
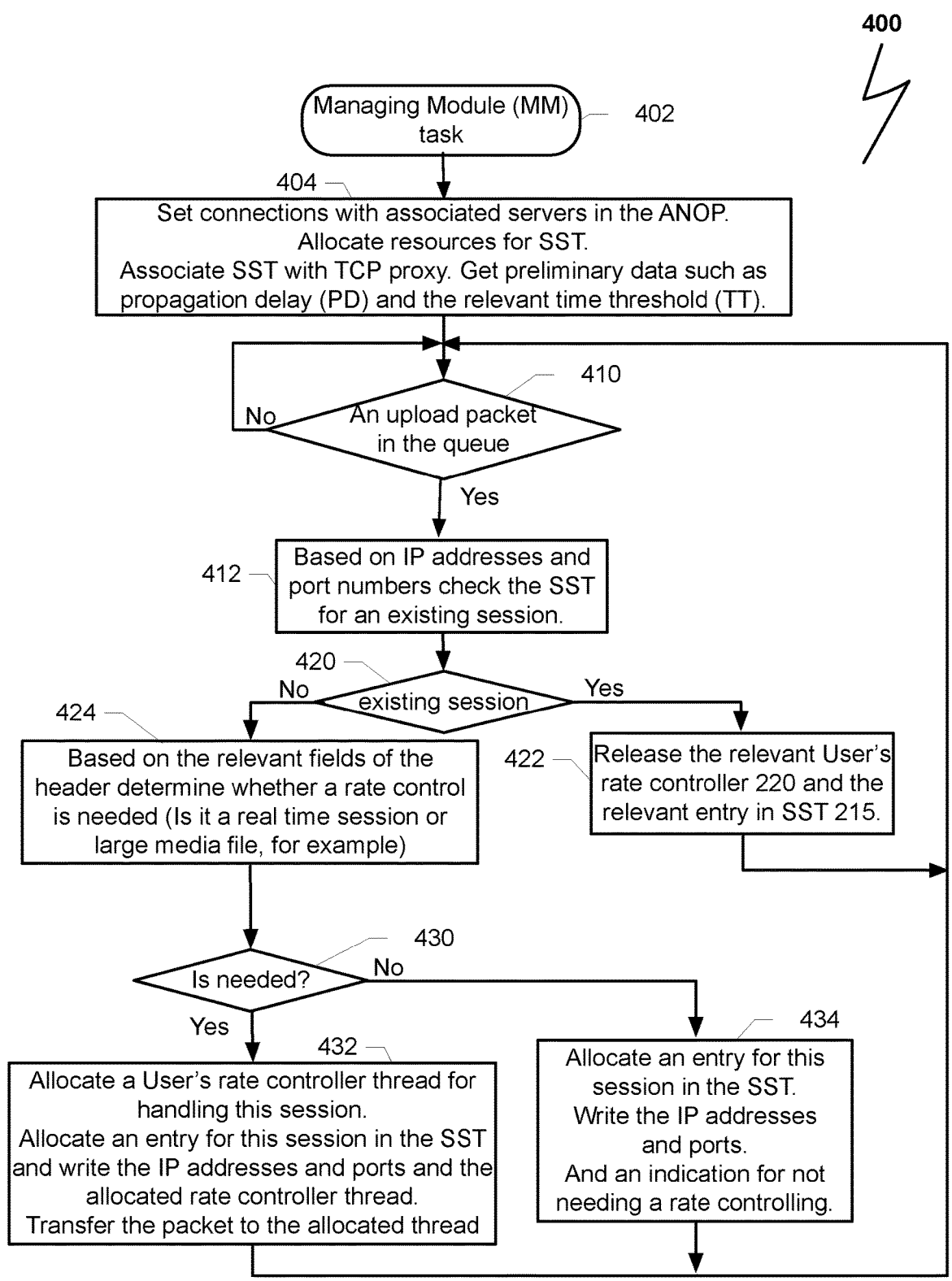
FIG. 4 illustrates a flowchart with relevant actions of an example managing process that can be implemented by an example of a manager module, according to the teaching of the present disclosure.

Referring now to FIG. 4, which illustrates a flowchart with relevant actions of an example managing process 400 that can be implemented by an example of a manager module (MM) 230 (FIG. 2). Upon initiation 402, connections with associated servers in the ANOP 130 can be set 404. Servers such as but not limited to AGW 134; BGW 138 (FIG. 1); Firewall (not shown in the figures); etc. In addition, computing and storage resources can be allocated 404 to the different modules of URCS 200. Modules such as but not limited to SST 215, UMDRC 220a-c, (FIG. 2) etc. Preliminary data can be collected and be loaded to the appropriate module. Data such as the propagation delay (PD) along the different connections between the mobile devices 110 and the URCS 136 (FIG. 1), the time threshold (TT) used by the different intermediate nodes 132, etc.

At block 410 the queue at the ingress of MM 230 can be checked 410 for determining whether any upload packets are queued up. If 410 no packets are in the queue, then the process 400 can wait until a packet is placed into the queue. If 410 a packet exists in the upload queue, the header of the packet can be parsed 412 and based on the source and destination IP addresses and port values the SST 215 (FIG. 2) can be checked for determining whether the SST 215 (FIG. 2) is associated with those four values, indicating that the packet belongs to an existing session. The four values of the source and destination IP addresses and ports define a session. Those values can be used as a session ID (identification) number. Next, based on searching the SST 215 a decision can be made whether the relevant upload packet belongs to an existing session 420.

If 420 the packet belongs to an existing session, it means that the relevant packet indicating the end of the existing session. Because, two type of packets are transferred toward the MM 230. The packets can be the beginning of session sent (block 322 FIG. 3) transferred via the TCP proxy 210 (FIG. 2); or the end of session sent from the appropriate UMDRC 220 (as it is disclosed below in conjunction with block 514 FIG. 5). Therefore, if the packet belongs to an existing session 420, it means that the packet indicates end-of-session (EOS). Consequently, at block 422 resources which were allocated to that session can be released. Resources such as but not limited to UMDRC 220 or the relevant entry in SST 215 (FIG. 2), for example. Then process 400 can return to block 410 for handling the next packet in the queue.

If 420 an entry does not exist in the SST 215, indicating that the packet belongs to a new session. In some embodiments, if it's a new session, then the header of the packet is parsed 424 in order to determine the type of the session, is it a real time session, uploading of large media file such as video file, etc. Based on the type of the upload session a decision can be made 430 whether a UMDRC 220 (FIG. 2) is needed. Other embodiments may handle all flows regardless of content.

If 430 there is no need for an UMDRC 220, then at block 434 an entry in SST 215 is allocated for this session. The four values of the IP addresses and ports are written in the allocated entry and indication that there is no need for an UMDRC 220 is written in that entry. Then the packet is transferred toward its destination via the TCP proxy 210.

If 430 there is a need for an UMDRC 220, then at block 432 a UMDRC 220 is allocated for the new upload session, an entry in SST 215 is allocated for that session. The four values of the IP addresses and ports are written 432 and indication about the allocated UMDRC 220 is written in that entry. Then the packet is transferred toward the queue of the allocated UMDRC 220 and process 400 can return to block 410 for handling the next packet in the MM queue.

Figure 5:
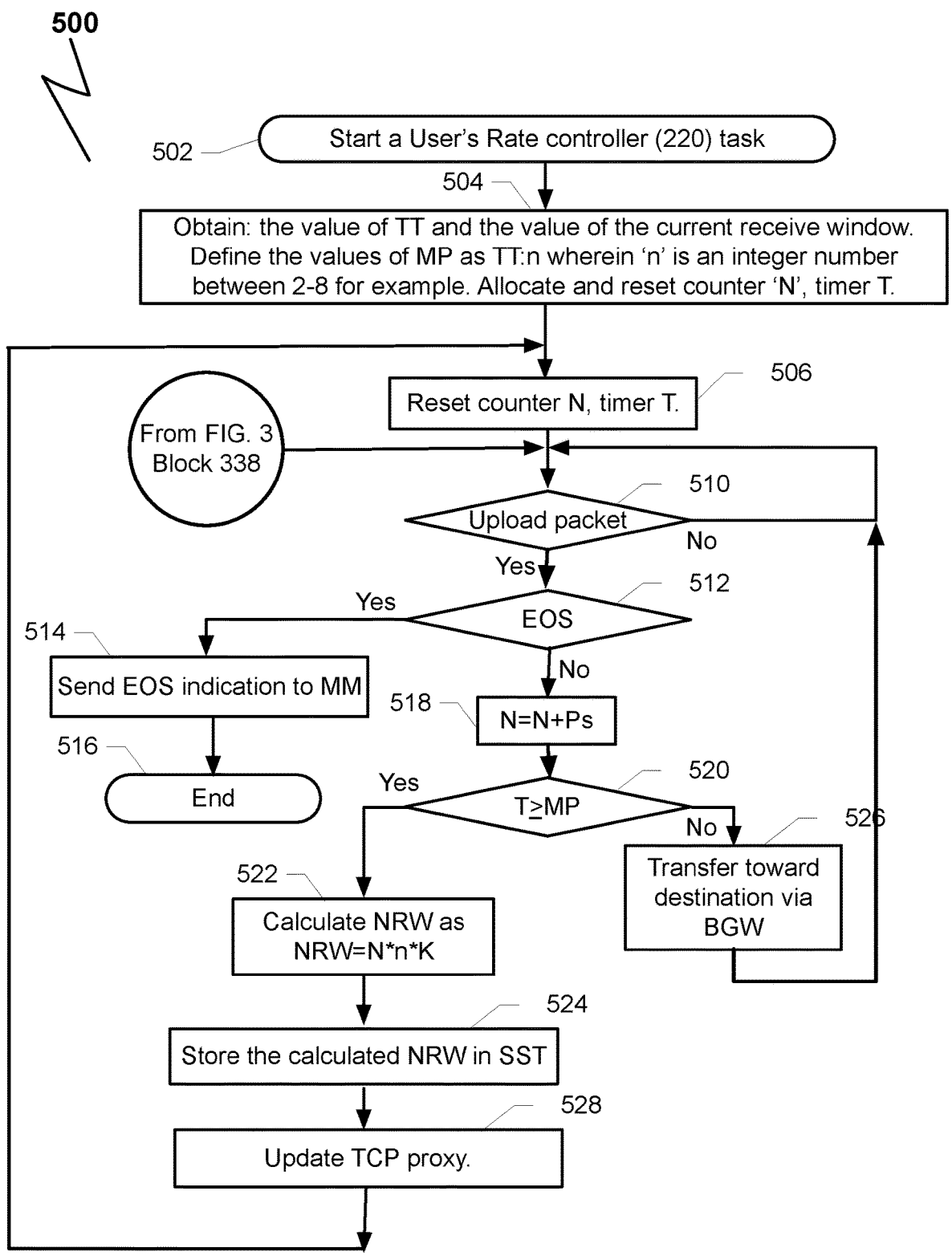
FIG. 5 illustrates a flowchart with relevant actions of an example rate controlling process that can be implemented by an example of a user's mobile-device-rate controller module (UMDRC), according to the teaching of the present disclosure.

Referring now to FIG. 5, which illustrates a flowchart with relevant actions of an example UMDRC task 500 that can be implemented by an example a UMDRC 220 (FIG. 2). After initiation 502 process 500 can obtain 504 the value of the time threshold (TT) and the value of the current receive window. Based on those values a value for the measuring period (MP) can be calculated as TT divided by 'n' (MP=TT:

n), wherein 'n' can be an integer number between 2-8, (4, or 5, for example). Other embodiments may use other values for 'n'. In addition a counter N and a timer T can be allocated 504. The counter N can count the number of obtained bytes (NoBY). While the timer T can be used for defining the MP. The clock of the timer T can be in the range between tens to hundreds of milliseconds, for example.

The time threshold (TT) used by the intermediate nodes 132 along the connection between the MD 110 and the URCS 136 can be found in the literature of the cellular operator, or of the technical equipment used in the intermediate nodes. In addition a safety factor can be used.

At block 506, counter N and the timer T can be reset and process 500 can wait 510 for obtaining an upload packet that belongs to the relevant upload session. The obtained upload packet can be parsed and if 512 it is an EOS packet, then the EOS packet indication can be transferred toward the MM 230 (FIG. 2). At block 515 the EOS packet is transferred toward its destination via the BGW 138 (FIG. 1) the SST 215 can be updated and process 500 can be terminated 516. If 512 the packet is not EOS, then at block 518 the counter N can be incremented by the amount of bytes (packet size—Ps) that are carried by the current upload packet (N=N+Ps) and the timer T can be checked 520 in order to verify that T is bigger or equal to the value of MP (T≥MP).

If 520 the value of T is smaller than MP, then at block 526 the packet is transferred toward its destination via the BGW 138 (FIG. 1). Then, process 500 can return to block 510 for handling the next packet in the queue. If 520 the value of the timer T is equal or larger than MP, then at block 522 a new value is calculated for the next-receive window (NRW). An example of the new value of the NRW can be calculated as the value of N multiplied by the value of 'n' and k, NRW=N*(n*k), wherein k is a tuning factor. An example value of k can be in the range between 0.5 and 2. Next, the value of the NRW can be stored 524 in the relevant field of SST 215 (FIG. 2) and the TCP proxy 210 can be updated 528 with the new value. Then, process 500 can return to block 506 and reset the counter N and the timer T, then at block 510 the process can wait for handling the next uploaded packet in the queue.

Some embodiments of method 500 can repeat the actions 520 to 524 several times in order to get few consecutive values for NRW, one per each cycle of action 522. Then the maximum value of the calculated NRW can be selected as the value of the NRW, which will be used for updating the TCP proxy at block 528.

The present disclosure describes few methods that can be used by a URCS 136 in order to improve and accelerate the rendering of an upload session from a mobile device 120 toward a web server 150 (FIG. 1). In another example embodiment a SACK and DSACK can be used for requesting a missing packet without reducing the congestion window to half of the current used congestion window. An example of such technique is disclosed above in conjunction with FIG. 3.

In the description and claims of the present application, each of the verbs, "comprise", "include" and "have", and conjugates thereof, are used to indicate that the object or objects of the verb are not necessarily a complete listing of members, components, elements, or parts of the subject or subjects of the verb.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Many other ramification and variations are possible within the teaching of the embodiments comprising different combinations of features noted in the described embodiments.

It will be appreciated by persons skilled in the art that the present invention is not limited by what has been particularly shown and described herein above. Rather the scope of the invention is defined by the claims that follow.

The invention claimed is:

1. A method comprising:
    (a) employing an upload-rate-controlling server (URCS) that is communicatively coupled between a plurality of mobile devices (MD) through an access gateway (AGW) and a plurality of Internet Protocol (IP) servers;
    (b) the AGW being configured to perform the actions of:
        (i) intercepting at least one stream of packets from a plurality of the streams of packets that are transferred between one of the MDs from the plurality of MDs and one of the IP server from the plurality of IP servers;
        (ii) determining that the intercepted stream of packets belong to an upload session; and
        (iii) transferring the intercepted stream of packets to the URCS
    (c) the URCS being configured to perform the action of manipulating the one MD from the plurality of MDs to maintain a transmitting rate of the intercepted stream of packets of the upload session.

2. The method of claim 1, wherein the URCS is configured to perform the actions of manipulating the one MD from the plurality of MDs to maintain the transmitting rate of the intercepted stream of packets of the upload session by:
    (1) determining that one or more packets are missed in the intercepted stream of packets;
    (2) sending, toward the one MD, a selective acknowledge (SACK) packet indicating the one or more packets that are missed;
    (3) obtaining the one or more missed packets; and
    (4) sending a duplicating-selective ACK (DSACK) indicating that the obtained one or more packets were not missed but were obtained out of order.

3. The method of claim 1, wherein the intercepted stream of packets that belong to the upload session carry media content.

4. The method of claim 1, wherein the action of manipulating the one MD to maintain the transmitting rate of the intercepted stream of packets of the upload session, further comprising adapting a value of a receive window sent toward the MD to be based on a number of bytes obtained from the one MD within a measure period (MP).

5. The method of claim 4, wherein the MP is based on a time threshold (TT) used by intermediate nodes, located over connection between the one MD and the URCS, for dropping stored packets of the intercepted stream of packets that belong to the upload session.

6. The method of claim 5, wherein the URCS is further configured to perform the action of calculating a value of a next receiving window (NRW) proportional to an amount of bytes that are obtained (NoBY) during an MP and a number of MP that are included in the TT.

7. The method of claim 1, wherein the URCS is further configured to control the transmitting rate of the one MD by:
    (a) estimating a delay of the intercepted stream of packets of the upload session;

(b) adapting the value of a next receive window (NRW) such that the delay of the intercepted stream of packets of the upload session is smaller than a value of a time threshold (TT) used by intermediate nodes along the upload connection for dropping packets.

8. The method of claim 7, wherein the NRW is proportional to the value of TT and inversely-proportional to the transmitting rate of the intercepted stream of packets of the upload session.

9. The method of claim 1, wherein the URCS is further configured to perform the action of calculating a delay of the intercepted stream of packets by:
   (a) obtaining a value for a propagation delay along one or more intermediate nodes;
   (b) measuring a value of a round trip time (RTT) of the intercepted stream; and
   (c) reducing the value of the propagation delay from the value of the RTT.

10. The method of claim 9, wherein in order to measure the RTT during an ongoing upload session the URCS is further configured to perform the actions of using a unique receiving window, which is substantially greater than a receiving window that is mostly used in the upload session.

* * * * *